(12) United States Patent
Arimoto et al.

(10) Patent No.: US 9,055,656 B2
(45) Date of Patent: Jun. 9, 2015

(54) DISCHARGE LAMP OPERATING APPARATUS

(71) Applicant: USHIO DENKI KABUSHIKI KAISHA, Tokyo (JP)

(72) Inventors: Taro Arimoto, Hyogo (JP); Yoichi Kono, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/064,049

(22) Filed: Oct. 25, 2013

(65) Prior Publication Data

US 2014/0117880 A1    May 1, 2014

(30) Foreign Application Priority Data

Oct. 25, 2012 (JP) ................................ 2012-235340

(51) Int. Cl.
*H05B 37/02* (2006.01)
*H05B 41/292* (2006.01)
*H05B 41/288* (2006.01)

(52) U.S. Cl.
CPC ........ *H05B 41/2928* (2013.01); *H05B 41/2883* (2013.01); *H05B 41/2886* (2013.01); *Y02B 20/202* (2013.01); *Y02B 20/208* (2013.01)

(58) Field of Classification Search
CPC .......... H05B 41/2928; H05B 41/2883; H05B 41/2886; H05B 41/24; H05B 41/38; H05B 41/382; H05B 41/3925; H05B 41/3928; H05B 41/2882; Y02B 20/208; Y02B 20/202; Y02B 20/204

USPC .......... 315/50, 224–226, 246, 307–308, 326, 315/360
See application file for complete search history.

(56) References Cited

U.S. PATENT DOCUMENTS

| | | | | | |
|---|---|---|---|---|---|
| 5,475,284 | A | * | 12/1995 | Lester et al. .............. | 315/209 R |
| 5,997,162 | A | * | 12/1999 | English et al. ............... | 362/508 |
| 7,960,923 | B2 | * | 6/2011 | Arimoto et al. ............... | 315/307 |

(Continued)

FOREIGN PATENT DOCUMENTS

| | | |
|---|---|---|
| JP | S63-216296 A | 9/1988 |
| JP | 2011-129454 A | 6/2011 |
| JP | 2011187255 A | 9/2011 |

OTHER PUBLICATIONS

An Office Action; "Notice of Reasons for Rejection," issued by the Japanese Patent Office on Jun. 10, 2014, which corresponds to Japanese Patent Application No. 2012-235340 and is related to U.S. Appl. No. 14/064,049.

*Primary Examiner* — Vibol Tan
(74) *Attorney, Agent, or Firm* — Studebaker & Brackett PC

(57) ABSTRACT

A discharge lamp operating apparatus including: a discharge lamp; an operating circuit; a voltage measuring unit; a magnetic field applying unit; and a control unit, wherein the voltage measuring unit measures the voltage of power at sampling intervals, the control unit calculates an average value VL1 of a group of the measured value of the voltage as a standard and an average value VL2 of a group of the measured value of the voltage for comparison after a predetermined time has elapsed from the measurement of the measured value of the voltage measured at the beginning from the group of the measured value of the voltage as a standard, and when the difference (VL2−VL1) between the average value VL1 and the average value VL2 exceeds a predetermined value, drives the magnetic field applying unit.

2 Claims, 2 Drawing Sheets

(56) References Cited

U.S. PATENT DOCUMENTS

| | | | |
|---|---|---|---|
| 8,436,545 B2 * | 5/2013 | Goto et al. | 315/246 |
| 8,450,945 B2 * | 5/2013 | Heuermann | 315/307 |
| 8,513,893 B2 * | 8/2013 | Ono et al. | 315/209 R |
| 8,541,954 B2 * | 9/2013 | Saka et al. | 315/246 |
| 8,547,016 B2 * | 10/2013 | Matsuura | 315/50 |
| 8,547,038 B2 * | 10/2013 | Saka | 315/326 |
| 2011/0215741 A1 | 9/2011 | Morimoto | |

* cited by examiner

1

DISCHARGE LAMP OPERATING APPARATUS

BACKGROUND OF THE INVENTION

1. Technical Field

The present invention relates to a discharge lamp operating apparatus. Specifically, the invention relates to a discharge lamp operating apparatus used as a light source for a projector in movie theaters.

2. Background Art

In recent years, in movie theaters, replacement from film projectors to digital projectors is accelerated. Although a discharge lamp such as a short-arc type xenon discharge lamp is widely used as a light source both in film projectors and digital projectors, luminance required for the discharge lamp is different between the film projectors and the digital projectors. More specifically, in the digital projectors, focusing light into a narrower area is required in comparison with that required for the film projectors when focusing light on an end surface of an integrator rod. Therefore, noble gas (xenon) is charged into the discharge lamp for the digital projectors at a substantially higher pressure than the case of the discharge lamp for the film projectors in order to form a shorter and thinner arc.

In the discharge lamp having a higher noble gas pre-charge pressure, the lamp current density during lighting is high. Accordingly, the temperature of a distal end of the electrode is increased to a substantially high temperature, so that the electrode substance at the distal end portion of the electrode is subject to evaporation.

In the xenon discharge lamp, halogen is not included as a charged substance and hence a function to maintain the distal end portion of the electrode by an accumulation of the evaporated electrode substance on the distal end of the electrode by a so-called halogen cycle is not provided. Therefore, the distance between the electrodes is increased as the operating time of the discharge lamp advances, and the lamp voltage is increased accordingly and, consequently, a retention ability of the arc is lowered.

The discharge lamp is practically in operation in the horizontal posture in the interior of the projector, and hence xenon gas as light-emitting gas flows convectively in the light-emitting tube by heat generating while the discharge lamp is in operation. Therefore, as a result that an upward stress is imparted on the ark by the xenon gas flowing convectively, a phenomenon of the arc curving on the upper side or an upward displacement of an original point of the ark occurs. When such the phenomenon of the arc curving on the upper side occurs, the length of the discharge path of the arc is increased, whereby the lamp voltage required for maintaining the arc is increased. When the phenomenon of the arc curving on the upper side occurs excessively, the lamp voltage is increased excessively, and hence the discharge lamp goes out. The phenomenon of the arc curving on the upper side occurs more remarkably as the retention ability of the arc is lowered with an increase in interelectrode spacing of the discharge lamp.

In order to solve the problem as described above, a discharge lamp operation circuit having a method of applying a magnetic field for suppressing the phenomenon of the arc formed in the discharge lamp curving on the upper side is proposed (See JP-A-2011-187255).

According to the discharge lamp operating apparatus, a Lorentz force is applied downward by applying a magnetic field in a direction vertical to a direction of extension of the arc and in the horizontal direction with respect to the arc of the discharge lamp, and the Lorentz force suppresses the phenomenon of the arc curving on the upper side.

Therefore, the discharge lamp operating apparatus described above has a problem that the arc is deformed downward and becomes unstable when the magnetic field is applied on the arc when the phenomenon of the arc curving on the upper side does not occur on the arc in the discharge lamp, that is, when the arc is maintained in a horizontal stable state. Therefore, control of the magnetic field applying unit depending on the existence of the phenomenon of the arc curving on the upper side is required.

As means for confirming the occurrence of the phenomenon of the arc curving on the upper side, (1) a means for confirming the occurrence of the phenomenon of the arc curving on the upper side by picking up of an image of the ark by, for example, a CCD camera or the like and analyzing an obtained video data, and (2) a means for confirming the occurrence of the phenomenon of the arc curving on the upper side by sensing an increase in voltage of the discharge lamp generated in association with the occurrence of the phenomenon of the arc curving on the upper side are conceivable.

From the two means described above, the means (1) has problems that the entire operating circuit becomes complex as a whole, the cost of the operating circuit is high, and monitoring all the time while the discharge lamp is in operation is difficult. Therefore, the means (2) is practical.

However, the means for confirming the occurrence of the phenomenon of the arc curving on the upper side by sensing the increase in voltage of the discharge lamp has a following problem.

Since the current density of the discharge lamp used in the digital projector is extremely high during operation, a plurality of minute projections are liable to be formed at the distal end of the electrode by fusing of the electrode substance, and hence a flicker occurs because of transfer of the original point of the arc between the minute projections. When the flicker as described above occurs in the discharge lamp, a significant voltage change occurs in an extremely short time. When a magnitude of the voltage change caused by the flicker is analogous to a magnitude of a voltage change caused by the phenomenon of the arc curving on the upper side, the voltage change caused by the flicker is erroneously sensed to be a voltage change caused by the phenomenon of the arc curving on the upper side. Consequently, a magnetic field is applied on the ark by the magnetic field applying unit, and hence instability of the ark is further increased, whereby the discharge lamp goes out.

SUMMARY

In view of such circumstances, it is an object of the invention to provide a discharge lamp operating apparatus capable of sensing a voltage change caused by a phenomenon of the arc formed in a discharge lamp curving on the upper side in distinction from other voltage changes, and suppressing reliably the phenomenon of the arc curving on the upper side.

In order to achieve the above object, a discharge lamp operating apparatus according to the present invention including:

a discharge lamp for discharging lights in a horizontal direction;

an operating circuit configured to supply power to the discharge lamp;

a voltage measuring unit configured to measure a voltage of power supplied to the discharge lamp;

a magnetic field applying unit configured to suppress a phenomenon of the arc curving on the upper side occurring in the discharge lamp; and a control unit configured to control the operating circuit and the magnetic field applying unit, wherein the voltage measuring unit is configured to measure the voltage of power supplied to the discharge lamp repeatedly at a predetermined sampling interval t during the operation of the discharge lamp, the control unit calculates an average value VL1 of a group of the measured value of the voltage as a standard including a plurality of measured values of the voltage measured within a predetermined time Ta and calculates an average value VL2 of a group of the measured value of the voltage for comparison including a plurality of measured values of the voltage measured within the predetermined time Ta after a predetermined time Tb has elapsed from the measurement of the measured value of the voltage measured at the beginning from the group of the measured value of the voltage as a standard and, when the difference (VL2−VL1) between the average value VL1 of the group of the measured value of the voltage as a standard and the average value VL2 of the group of the measured value of the voltage for comparison exceeds a predetermined value, drives the magnetic field applying unit.

Preferably, in the discharge lamp operating apparatus of the invention, the predetermined time Tb from the measurement of the measured value of the voltage measured at the beginning from the group of the measured value of the voltage as a standard to the measurement of the first measured value of the voltage of the group of the measured value of the voltage for comparison is 1 to 10 seconds.

According to the discharge lamp operating apparatus configured as described above, the control unit compares the average value VL1 of the group of the measured value of the voltage as a standard composed of the plurality of measured value of voltages measured within the predetermined time Ta and the average value VL2 of the group of the measured value of the voltage for comparison composed of the plurality of measured value of voltages measured within the predetermined time Ta after the predetermined time Tb has elapsed from the measurement of the first measured value of voltage of the group of the measured value of the voltage as a standard, thereby being capable of sensing the voltage change caused by the phenomenon of the arc formed in the discharge lamp curving on the upper side in distinction from other voltage changes. The magnetic field applying unit is driven when the difference (VL2−VL1) between the average value VL1 of the group of the measured value of the voltage as a standard and the average value VL2 of the group of the measured value of the voltage for comparison exceeds the predetermined value, whereby the phenomenon of the arc curving on the upper side is reliably suppressed. Therefore, the discharge lamp is prevented from going off due to the voltage change caused by the phenomenon of the arc curving on the upper side.

DESCRIPTION OF THE INVENTION

Figure 1:
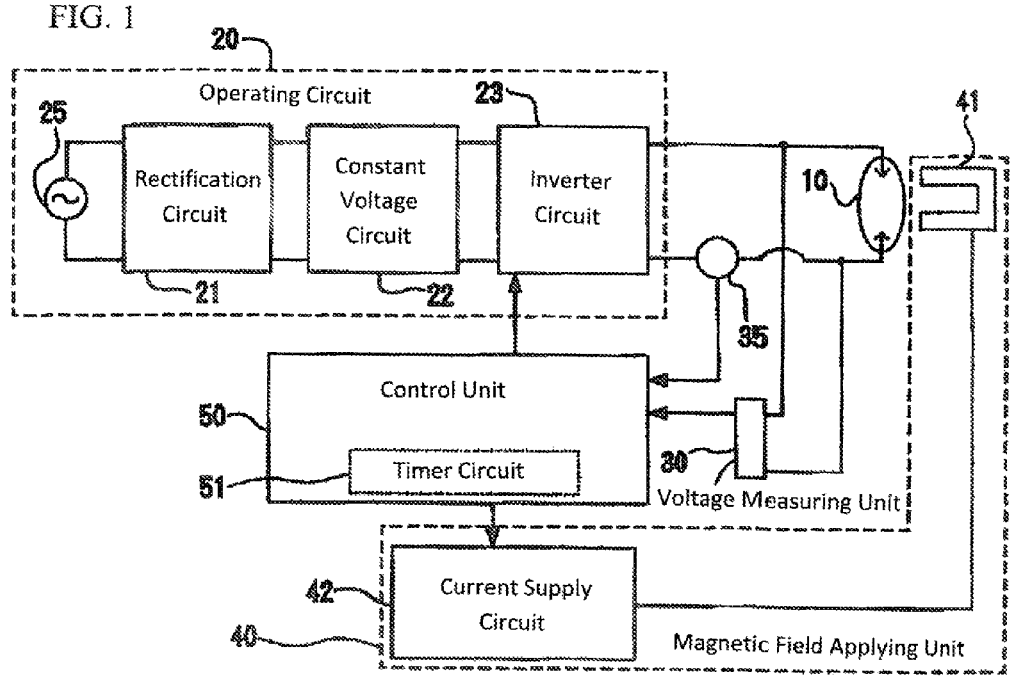
FIG. 1 is an explanatory drawing illustrating a schematic configuration of an example of a discharge lamp operating apparatus of the invention.

Referring now to the drawings, an embodiment of a discharge lamp operating apparatus of the invention will be described.

FIG. 1 is an explanatory drawing illustrating a configuration of an example of a discharge lamp operating apparatus of the invention. The discharge lamp operating apparatus is used as a light source for digital projectors in movie theaters, for example, and includes a discharge lamp 10 for horizontal operation, an operating circuit 20 configured to supply power to the discharge lamp 10, a voltage measuring unit 30 configured to measure the voltage of the power supplied to the discharge lamp 10, a current measuring unit 35 configured to measure a current of the power supplied to the discharge lamp 10, a magnetic field applying unit 40 configured to suppress a phenomenon of an arc generating in the discharge lamp 10 curving on the upper side, a control unit 50 configured to control the operating circuit 20 and the magnetic field applying unit 40.

Figure 2:
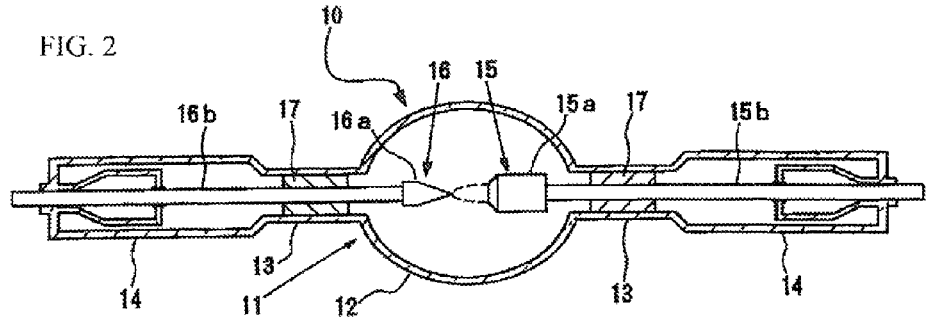
FIG. 2 is an explanatory cross-sectional view illustrating a configuration of an example of the discharge lamp used in the discharge lamp operating apparatus illustrated in FIG. 1.

FIG. 2 is an explanatory cross-sectional view illustrating a configuration of an example of the discharge lamp used in the discharge lamp operating apparatus illustrated in FIG. 1.

The discharge lamp 10 is a short-ark type xenon discharge lamp, and a light-emitting tube 11 is formed of, for example, a quartz glass. The light-emitting tube 11 includes a light-emitting unit 12 having a substantially ellipsoidal spherical-shaped outline that defines a charging space in the interior thereof, sealing units 13 connected integrally with respective both ends of the light-emitting unit 12 and having a cylindrical shape extending outward along a tube axis, and an electrode supporting units 14 connected integrally with respective outer ends of the sealing units 13 and having an outer diameter larger than the outer diameter of the sealing units 13.

The light-emitting unit 12 of the light-emitting tube 11 includes in the interior thereof an anode 15 and a cathode 16 both formed of tungsten so as to face each other. More specifically, the anode 15 includes a rod-shaped shaft portion 15b extending along the direction of the tube axis of the light-emitting tube 11, and a head portion 15a formed continuously from a distal end of the shaft portion 15b. In contrast, the cathode 16 includes a rod-shaped shaft portion 16b extending along the direction of the tube axis of the light-emitting tube 11, and a head portion 16a formed continuously from a distal end of the shaft portion 16b. The anode 15 and the cathode 16 are arranged so that the respective head portions 15a and 16a thereof face each other, and the respective shaft portions 15b and 16b project from both ends of the light-emitting unit 12 via the sealing units 13 and the electrode supporting units 14.

The distance between the anode 15 and the cathode 16 (interelectrode spacing) is, for example, 2 to 10 mm.

Cylindrical-shaped glass members 17 having an outer diameter which fits the inner diameter of the sealing units 13 and an inner diameter which fits the outer diameter of the respective shaft portions 15b and 16b of the anode 15 and the cathode 16 are arranged inside the respective sealing units 13 of the light-emitting tube 11 along the axial direction of the light-emitting tube 11. The outer peripheral surfaces of the respective glass members 17 fit hermetically with the inner peripheral surfaces of the sealing units 13 of the light-emitting tube 11. The outer peripheral surfaces of the respective glass members 17 hermetically fit with the outer peripheral surfaces of the shaft portions 15b and 16b of the anode 15 and the cathode 16, which are inserted into cylindrical hole of the glass member 17.

Proximal portions of the shaft portions 15b and 16b of the anode 15 and the cathode 16 are secured to the respective electrode supporting units 14 of the light-emitting tube 11 and, accordingly, the anode 15 and the cathode 16 are supported by the electrode supporting units 14 respectively.

Xenon gas is charged as light-emitting gas in the interior of the light-emitting unit 12 of the light-emitting tube 11. The pre-charge pressure of the xenon gas is, for example, 0.5 to 5.0 MPa in static pressure.

A current rating of the discharge lamp 10 is, for example, 25 to 175A, a voltage rating is, for example, 20 to 45V, and a power rating is, for example, 1 to 8 kW.

The operating circuit 20 includes a rectification circuit 21 configured to convert an AC power supplied from a commercial AC source 25 into a DC power, a constant-voltage circuit 22 configured to control a DC voltage from the rectification circuit 21 to be a constant voltage and output the same therefrom, and an inverter circuit 23 configured to convert the constant voltage DC power from the constant-voltage circuit 22 into a predetermined power by a signal from the control unit 50 and supply the same to the discharge lamp 10.

As the inverter circuit 23, a known configuration having a bridge circuit including a plurality of switching semiconductor elements, and supplying desired power to the discharge lamp 10 according to a duty ratio in response to a transmitted pulse width control signal may be employed.

The operating circuit 20 is provided with a starting circuit or the like for starting the operation of the discharge lamp 10, although not illustrated in the drawing.

The voltage measuring unit 30 is configured to measure the voltage of power supplied to the discharge lamp 10 repeatedly at predetermined sampling intervals t during the operation of the discharge lamp 10. The sampling interval t is preferably 0.01 second or shorter. When the sampling intervals t exceed 0.01 second, a voltage variation generated from a certain voltage measuring time to a next voltage measuring time cannot be detected, and accurate sensing of a standard voltage change in the operating state of the discharge lamp 10 may become difficult.

The magnetic field applying unit 40 is configured to apply a magnetic field to the arc formed between the anode 15 and the cathode 16 of the discharge lamp 10 in the direction orthogonal to the direction of extension of the arc and in the horizontal direction, and suppress the phenomenon of the arc curving on the upper side by the Lorentz force generated by this magnetic field. The magnetic field applying unit 40 of the illustrated example includes an electromagnet 41 arranged in the vicinity of the discharge lamp 10, and a current supply circuit 42 that supplies an electric current to the electromagnet 41.

The control unit 50 is configured to control the power supplied by the discharge lamp 10 by delivering a pulse width control signal or the like to the inverter circuit 23 on the basis of information relating to the voltage and the current of the power measured by the voltage measuring unit 30 and the current measuring unit 35 and supplied to the discharge lamp 10, and control drive and stop of the magnetic field applying unit 40 by delivering a control signal to the current supply circuit 42 of the magnetic field applying unit 40. The control unit 50 is provided with a timer circuit 51 configured to count a predetermined time, described later.

In the discharge lamp operating apparatus of the invention, the discharge lamp 10 is operated by the power supplied from the operating circuit 20 to the discharge lamp 10, and the phenomenon of the arc formed in the discharge lamp 10 curving on the upper side is suppressed by the magnetic field applying unit 40 being controlled by the control unit 50 in a manner shown below.

During the operation of the discharge lamp 10, the voltage of the power supplied to the discharge lamp 10 is repeatedly measured by the voltage measuring unit 30 at predetermined sampling intervals t.

Figure 3:
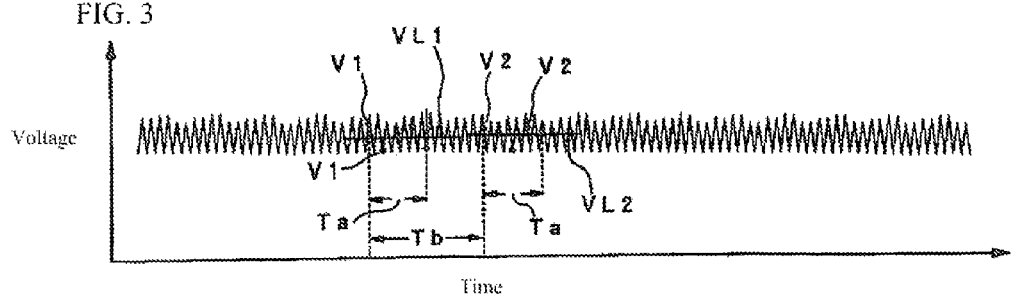
FIG. 3 is a graph illustrating a change of a measured value of the voltage of power supplied to the discharge lamp in a normal state operation.
Figure 4:
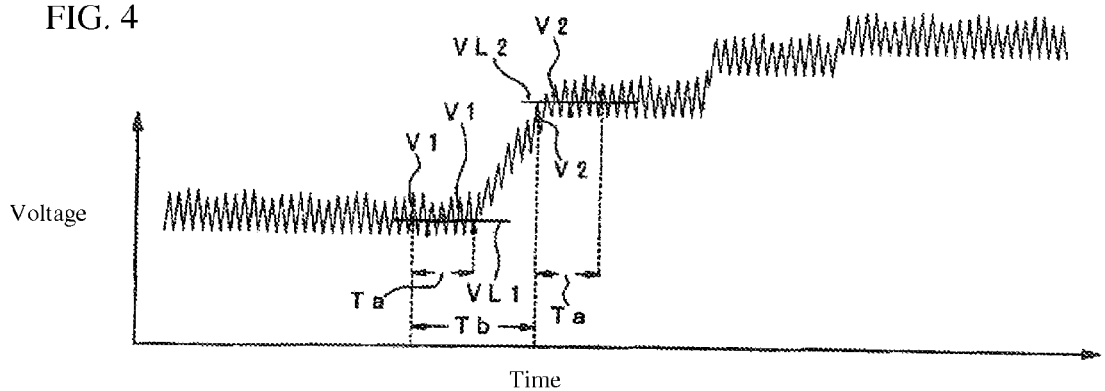
FIG. 4 is a graph illustrating a change of a measured value of the voltage of power supplied to the discharge lamp before and after an occurrence of a phenomenon of the arc curving on the upper side.

FIG. 3 is a graph illustrating a change of a measured value of the voltage of power supplied to the discharge lamp 10 in a normal operating state, and FIG. 4 is a graph illustrating a change of a measured value of the voltage of the power supplied to the discharge lamp 10 before and after an occurrence of the phenomenon of the arc curving on the upper side. In the graphs illustrated in FIG. 3 and FIG. 4, vertical axes represent a measured value of the voltage of the power supplied to the discharge lamp 10, and lateral axes represent an operating time of the discharge lamp 10.

As illustrated in FIG. 3, in the normal operating state, the voltage of the power supplied to the discharge lamp 10 changes a little at extremely short time intervals, but is in a stable state in long time intervals. In contrast, as illustrated in FIG. 4, when the phenomenon of the arc curving on the upper side occurs, the voltage of the power supplied to the discharge lamp 10 is significantly increased.

Figure 5:
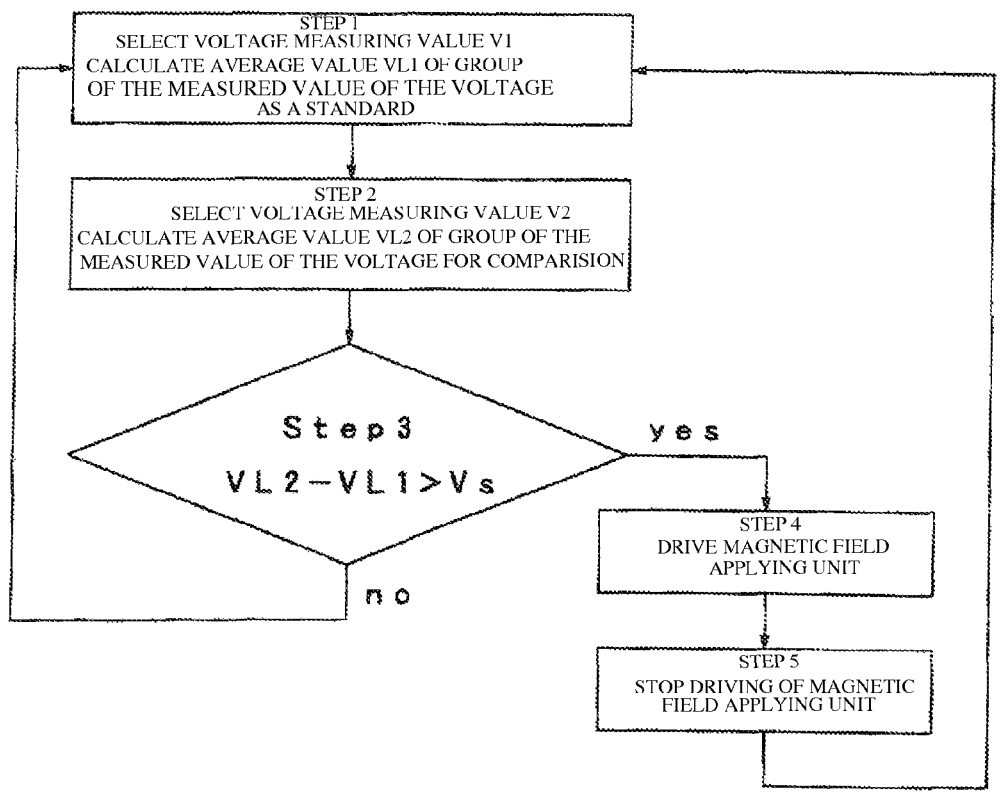
FIG. 5 is a flowchart illustrating a control operation of a magnetic field applying unit by a control unit.

FIG. 5 is a flowchart illustrating a control operation of a magnetic field applying unit by the control unit 50. As illustrated in FIG. 5, a control operation of the magnetic field applying unit by the control unit 50 will be described.

In the control unit 50, a plurality of measured values of the voltage V1 measured within a predetermined time Ta and an average value VL1 of a group of the measured value of the voltage as a standard Vg1 composed of the measured values of the voltage V1 is calculated (Step 1). After a predetermined time Tb has elapsed from the measurement of the measured values of the voltage V1 measured at the beginning from the group of the measured value of the voltage as a standard Vg1, a plurality of measured values of the voltage V2 measured within the predetermined time Ta is selected and an average value VL2 of a group of the measured value of the voltage for comparison Vg2 composed of the measured values of the voltage V2 is calculated (Step 2). Then, the average value VL1 of the group of the measured value of the voltage as a standard Vg1 is compared with the average value VL2 of the group of the measured value of the voltage for comparison Vg2 (Step 3). Hereinafter, a series of operations of the selection of the measured values of the voltage V1 and the calculation of the average value VL1 (Step 1) and the selection of the measured values of the voltage V2 and the calculation of the average value VL2 (Step 2), and comparison of the average value VL1 with the average value VL2 (Step 3) described above is referred to as "average value of the voltage comparing operation".

As illustrated in FIG. 3, when the difference (VL2−VL1) between the average value VL1 and the average value VL2 is equal to or smaller than a predetermined standard value Vs, the average value of the voltage comparing operation (Step 1 to Step 3) is repeatedly performed.

In contrast, as illustrated in FIG. 4, when the difference (VL2−VL1) between the average value VL1 and the average value VL2 exceeds the predetermined standard value Vs, the magnetic field applying unit 40 is driven (Step 4) and stops driving of the magnetic field applying unit 40 after a predetermined time has elapsed (Step 5). Subsequently, the average value of the voltage comparing operation (Step 1 to Step 3) is repeatedly performed.

In the operation described above, the sampled number of measured values of the voltage V1 selected as the group of the measured value of the voltage as a standard Vg1 and the sampled number of the measured values of the voltage V2 selected as the group of the measured value of the voltage for comparison Vg2 are preferably three or more, respectively.

The predetermined time Ta for selecting the measured values of the voltage V1 and the measured values of the voltage V2 is preferably from 0.5 to 5 seconds. When the predetermined time Ta exceeds 5 seconds, it requires long time for acquiring an average value, so that the responsiveness with respect to the abrupt phenomenon of the arc curving on the upper side is lowered.

The predetermined time Tb from the measurement of the first measured value of the voltage V1 in the group of the measured value of the voltage as a standard Vg1 to the measurement of the first measured value of the voltage V2 of the group of the measured value of the voltage for comparison Vg2 is preferably from 1 to 10 seconds. When the predetermined time Tb is shorter than one second, it is shorter than the time during which the phenomenon of the arc curving on the upper side occurs, and hence the voltage change caused by the flicker cannot be distinguished from the voltage change caused by the phenomenon of the arc curving on the upper side of the arc. In contrast, when the predetermined time Tb exceeds 10 seconds, an abrupt voltage increase may occur depending on the degree of the generated phenomenon of the arc curving on the upper side, so that the timing of drive of the magnetic field applying unit 40 is delayed, and the discharge lamp 10 may go off.

The predetermined time Tb may either be longer or shorter than the predetermined time Ta as long as falling within the above-described range. When the predetermined time Tb is shorter than the predetermined time Ta, the timing of measurement of the first measured value of the voltage V2 in the group of the measured value of the voltage for comparison Vg2 is earlier than the timing of measurement of the first measured value of the voltage V1 of the group of the measured value of the voltage as a standard Vg1, and some of the selected measured values of the voltage V1 of the group of the measured value of the voltage as a standard Vg1 and some of the selected measured values of the voltage V2 of the group of the measured value of the voltage for comparison Vg2 are overlapped.

The standard value Vs of the difference (VL2−VL1) between the average value VL1 and the average value VL2 which determines driving of the magnetic field applying unit 40 is preferably selected from the range of 0.7 to 5V. When the standard value Vs is smaller than 0.7V, a minute voltage change during the stable operation is also sensed, whereby the magnetic field applying unit drives. In contrast, when the standard value Vs exceeds 5V, the ark is excessively curved by the phenomenon of the arc curving on the upper side and comes into contact with a tube wall. Therefore, the discharge lamp 10 may go out before the magnetic field applying unit 40 is driven.

In a case where the difference (VL2−VL1) between the average value VL1 and the average value VL2 exceeds the predetermined standard value Vs, the time during which the magnetic field applying unit 40 is driven, that is, the time during which the magnetic field is applied to the arc of the discharge lamp 10 is preferable from 1 to 180 seconds although it depends on the intensity of the magnetic field to be applied.

According to the discharge lamp operating apparatus configured as described above, the control unit 50 compares the average value VL1 of the group of the measured value of the voltage as a standard Vg1 composed of the plurality of measured values of the voltages V1 measured within the predetermined time Ta and the average value VL2 of the group of the measured value of the voltage for comparison composed of the plurality of measured values of the voltage measured within the predetermined time Ta after the predetermined time Tb has elapsed from the measurement of the first measured value of the voltage V1 of the group of the measured value of the voltage as a standard Vg1, the voltage change caused by the phenomenon of the arc formed in the discharge lamp curving on the upper side may be sensed in distinction from other voltage changes due to the flicker or the like. This will be described in detail, hereinafter.

Figure 6:
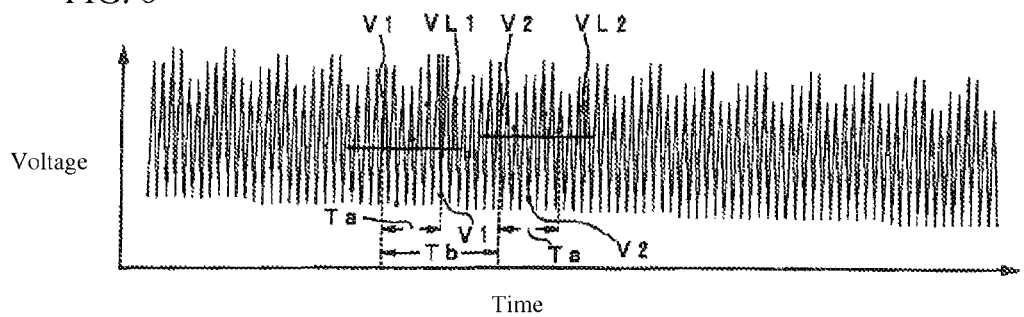
FIG. 6 is a graph illustrating a change of a measured value of the voltage of power supplied to the discharge lamp in a state in which a flicker occurs.

FIG. 6 is a graph illustrating a change of a measured value of the voltage of power supplied to the discharge lamp 10 in a state in which a flicker occurs. In the graphs illustrated in FIG. 6, vertical axes represent a measured value of the voltage of the power supplied to the discharge lamp 10, and lateral axes represent an operating time of the discharge lamp 10.

As illustrated in FIG. 6, when a flicker occurs in the discharge lamp 10, the voltage of the power supplied to the discharge lamp 10 is significantly increased and decreased at extremely short time intervals in comparison with the normal operating state (see FIG. 3). The magnitude of the voltage change caused by the flicker is analogous to the magnitude of the voltage change caused by the phenomenon of the arc curving on the upper side (see FIG. 4). However, the voltage change caused by the flicker occurs at extremely short time intervals, and hence if the average value VL1 of the group of the measured value of the voltage as a standard Vg1 measured within the predetermined time Ta is compared with the average value VL2 of the group of the measured value of the voltage for comparison Vg2 measured within the predetermined time Ta, the difference between the average value VL1 and the average value VL2 is extremely small. Therefore, even when the voltage of the power supplied to the discharge lamp 10 is significantly changed by the occurrence of the flicker in the discharge lamp 10, the voltage change in question is avoided from being erroneously sensed as the voltage change caused by the phenomenon of the arc curving on the upper side.

Since the magnetic field applying unit 40 is driven when the difference (VL2−VL1) between the average value VL1 of the group of the measured value of the voltage as a standard and the average value VL2 of the group of the measured value of the voltage for comparison exceeds the predetermined standard value Vs, a magnetic field is applied to the arc in the discharge lamp 10, whereby the Lorentz force is applied downward to the arc to reliably suppress the phenomenon of the arc curving on the upper side. Therefore, the discharge lamp 10 is prevented from going off due to the voltage change caused by the phenomenon of the arc curving on the upper side.

Although the embodiment of the discharge lamp operating apparatus of the invention has been described thus far, the invention is not limited to the above-described embodiment, and various modifications may be made.

For example, the magnetic field applying unit 40 may be those provided with a permanent magnet instead of those provided with the electromagnet 41.

In the embodiment described above, the measured values of the voltage V1 and the measured values of the voltage V2 are selected from the measured values of the voltage measured by the voltage measuring unit 30 while considering the predetermined time Tb or the like, and the average value VL1 of the group of the measure value of the voltage as a standard Vg1 and the average value VL2 of the group of the measured value of the voltage for comparison Vg2 are calculated. However, a configuration in which moving average deviation of the measured value of the voltage and a plurality of measured values of the voltage continuing therefrom are calculated for each of all the measured values of the voltage, and two average deviations may be selected from the calculated moving average deviations as the average value VL1 of the group of the measured value of the voltage as a standard Vg1 and the average value VL2 of the group of the measured value of the voltage for comparison Vg2.

EXAMPLES

A discharge lamp (short-arc type xenon discharge lamp) having specifications as shown below was made according to the configuration illustrated in FIG. 2, and a discharge lamp operating apparatus was made by using this discharge lamp according to the configuration illustrated in FIG. 1.
Specifications of Discharge Lamp
A light-emitting tube was formed of quartz glass, a maximum outer diameter of a light-emitting portion was 42 mm, and an internal volume of the light-emitting portion was 40 mm³.
The anode and the cathode were each formed of tungsten and the interelectrode spacing was 3.7 mm.
Xenon gas of 1.9 MPa in static pressure was charged in the light-emitting tube.
A current rating of the discharge lamp was 75A, a voltage rating thereof was 27V and a power rating thereof was 2 kW.

Experimental Example 1

The discharge lamp operating apparatus described above was used and power was supplied to the discharge lamp for 1500 hours while controlling the magnetic field applying unit by the control unit under the conditions shown below, and occurrence or non-occurrence of extinction of the discharge lamp during that period was inspected. The result is shown in Table 1.
Conditions of Control:
Sampling intervals t for measuring voltage=0.001 seconds (Sampling Frequency=1000 Hz)
Predetermined time Ta for acquiring the measured values of the voltage V1=2 seconds
The number of the measured values of the voltage V1 sampled from the group of the measured value of the voltage as a standard=5
The time from the measurement of the first measured value of the voltage V1 in the previous group of the measured value of the voltage as a standard to the measurement of the first measured value of the voltage V1 of the subsequent group of the measured value of the voltage as a standard=0.5 seconds.
Predetermined time Ta for acquiring the measured values of the voltage V2=2 seconds
The number of the measured values of the voltage V2 sampled from the group of the measured value of the voltage for comparison=5
Predetermined time Tb for acquiring the measured values of the voltage V2=2 seconds The standard value Vs of the difference (VL2−VL1) between the average value VL1 and the average value VL2=1V.
Drive time of the magnetic field applying unit=5 seconds Comparative Experimental Example 1

In the same manner as the Experimental Example 1 other than that the magnetic field applying unit was not controlled and kept in a stopped state, power was supplied from the operating circuit to the discharge lamp for 1500 hours, and occurrence or non-occurrence of extinction of the discharge lamp during that period was inspected. The result is shown in Table 1.

Comparative Experimental Example 2

In the same manner as the Experimental Example 1 other than that the control conditions of the magnetic field applying unit were changed as shown below, power was supplied from the operating circuit to the discharge lamp for 1500 hours, and occurrence or non-occurrence of extinction of the discharge lamp during that period was inspected. The result is shown in Table 1.
Conditions of Control:
The voltage of power supplied to the discharge lamp was repeatedly measured under the condition that the sampling intervals t were 0.001 seconds (Sampling Frequency=1000 Hz), one measured value of the voltage (hereinafter, referred to as "measured value of the voltage Va" was selected from the measured values of the voltage, a measured value of the voltage (hereinafter, referred to as "measured value of the voltage Vb") measured when 0.001 seconds has elapsed from the measurement of the measured value of the voltage Va was selected, and the measured value of the voltage Va and the measured value of the voltage Vb were compared (hereinafter, this operation is referred to as "voltage comparison operation"). When the difference (Vb−Va) between the measured value of the voltage Va and the measured value of the voltage Vb was 1V or smaller, the voltage comparison operation was performed repeatedly. When the difference (Vb−Va) between the measured value of the voltage Va and the measured value of the voltage Vb exceeds 1V, the magnetic field applying unit was driven for 5 seconds, and then the voltage comparison operation was performed repeatedly.

Comparative Experimental Example 3

In the same manner as the Comparative Experimental Example 2 other than that the sampling intervals t of the voltage measurement was changed to 0.01 seconds (sampling frequency=100 Hz), power was supplied from the operating circuit to the discharge lamp for 1500 hours, and occurrence or non-occurrence of extinction of the discharge lamp during that time was inspected. The result is shown in Table 1.

TABLE 1

| | Occurrence or Non-occurrence of Extinction of Discharge Lamp |
|---|---|
| Experimental Example 1 | Not occurred |
| Comparative Experimental Example 1 | Occurred |
| Comparative Experimental Example 2 | Occurred |
| Comparative Experimental Example 3 | Occurred |

As is clear from the result shown in Table 1, a voltage change caused by the phenomenon of the arc formed in the discharge lamp curving on the upper side was sensed in distinction from other voltage changes, and whereby the magnetic field applying unit was driven at an adequate timing in the experimental example 1, so that the fact that the phenomenon of the arc curving on the upper side was reliably suppressed and the extinction of the discharge lamp was prevented was confirmed.

In contrast, in the comparative experimental example 1, the magnetic field applying unit was not driven even when the phenomenon of the arc curving on the upper side occurred, extinction of the discharge lamp occurred.

In the comparative experimental example 2, since the independent measured values of the voltage Va and Vb were compared, even when the voltage change caused by the flicker occurred, the magnetic field applying unit was driven, whereby the arc became unstable and the extinction of the discharge lamp occurred.

In the comparative experimental example 3, the sampling intervals t for measuring the voltage were set to be longer than the comparative experimental example 2, since the independent measured values of the voltage Va and Vb were compared, even when the voltage change caused by the flicker occurred, the magnetic field applying unit was driven, whereby the arc became unstable and the extinction of the discharge lamp occurred.

What is claimed is:

1. A discharge lamp operating apparatus comprising:
   a discharge lamp for discharging lights in a horizontal direction;
   an operating circuit configured to supply power to the discharge lamp;
   a voltage measuring unit configured to measure a voltage of power supplied to the discharge lamp;
   a magnetic field applying unit configured to suppress a phenomenon of the arc curving on the upper side occurring in the discharge lamp; and
   a control unit configured to control the operating circuit and the magnetic field applying unit,
   wherein
   the voltage measuring unit is configured to measure the voltage of power supplied to the discharge lamp repeatedly at a predetermined sampling interval t during the operation of the discharge lamp,
   the control unit calculates an average value VL1 of a group of the measured value of the voltage as a standard including a plurality of measured values of the voltage measured within a predetermined time Ta; calculates an average value VL2 of a group of the measured value of the voltage for comparison including a plurality of measured values of the voltage measured within the predetermined time Ta after a predetermined time Tb has elapsed from the measurement of the measured value of the voltage measured at the beginning from the group of the measured value of the voltage as a standard; and drives the magnetic field applying unit when the difference (VL2−VL1) between the average value VL1 of the group of the measured value of the voltage as a standard and the average value VL2 of the group of the measured value of the voltage for comparison exceeds a predetermined value.

2. The discharge lamp operating apparatus according to claim 1, wherein the predetermined time Tb from the measurement of the measured value of the voltage measured at the beginning from the group of the measured value of the voltage as a standard to the measurement of the first measured value of the voltage of the group of the measured value of the voltage for comparison is 1 to 10 seconds.

\* \* \* \* \*